United States Patent
McMichael et al.

(10) Patent No.: US 11,500,067 B1
(45) Date of Patent: Nov. 15, 2022

(54) TIME OF FLIGHT SENSOR SYSTEM AND LENS

(71) Applicant: Zoox, Inc., Foster City, CA (US)

(72) Inventors: Ryan McMichael, Mountain View, CA (US); Robert Nicholas Moor, San Mateo, CA (US); Joseph Patrick Warga, San Francisco, CA (US); Silas Kogure Wilkinson, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 1021 days.

(21) Appl. No.: 16/206,885

(22) Filed: Nov. 30, 2018

(51) Int. Cl.
*G02B 9/62* (2006.01)
*G01S 7/481* (2006.01)
*G01S 17/10* (2020.01)
*G02B 9/64* (2006.01)

(52) U.S. Cl.
CPC .......... *G01S 7/4816* (2013.01); *G01S 17/10* (2013.01); *G02B 9/62* (2013.01); *G02B 9/64* (2013.01)

(58) Field of Classification Search
CPC ......... G01S 7/4816; G01S 17/10; G02B 9/62; G02B 9/64
See application file for complete search history.

(56) References Cited

U.S. PATENT DOCUMENTS

| | | | | |
|---|---|---|---|---|
| 5,513,046 A | * | 4/1996 | Toyama | G02B 13/04 359/752 |
| 5,627,686 A | * | 5/1997 | Ohshita | G02B 13/02 359/748 |
| 2015/0358601 A1 | * | 12/2015 | Oggier | G01S 7/4816 348/46 |
| 2018/0003803 A1 | * | 1/2018 | Kakani | G01S 7/4816 |
| 2018/0210177 A1 | * | 7/2018 | Liu | G02B 13/0045 |

* cited by examiner

*Primary Examiner* — Clayton E. LaBalle
*Assistant Examiner* — Diana Hancock
(74) *Attorney, Agent, or Firm* — Lee & Hayes, P.C.

(57) ABSTRACT

Various lens designs for use in Time of Flight (ToF) sensor systems are discussed. Improvements to a ToF sensor system may be realized by, for example, incorporating a lens having particular features, such as a relatively short track length, fast lens speed (e.g., low f-number), low telecentricity, relatively flat field illumination, and fairly low cost. In some examples, such a lens of a ToF sensor system may be a lens assembly having a fixed focal length and that avoids use of lenses having aspheric surfaces so as to achieve relatively low cost.

20 Claims, 5 Drawing Sheets

FIG. 6

TIME OF FLIGHT SENSOR SYSTEM AND LENS

BACKGROUND

A time of flight (ToF) sensor generally uses a technique for measuring distances to visible surfaces by emitting modulated light (e.g., visible or infrared) and measuring travel times and/or phases of the reflections of the emitted light.

A ToF sensor system has at least one illuminator (e.g., a light emitter) and a corresponding image sensor. The illuminator may comprise a laser that directs modulated light in the general direction of an object or surface. The image sensor may comprise a pixelated photodetector that converts light intensity per pixel to a corresponding electrical signal for individual pixels. Optical elements such as lenses may be used in the light transmission and reception paths to focus light, depending on the particular nature of the ToF sensor system.

A ToF sensor system has signal processing components that analyze properties (e.g., a phase) of reflected light signals to determine distances to surfaces from which the emitted light has been reflected. For example, the system may measure phases of the reflected light to determine the "flight time" of the light as it travels from the illuminator to the surface and is reflected back to individual pixels of the image sensor at the ToF sensor system. A distance is then calculated based on the flight time or phase and the known speed of light.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

A time of flight (ToF) sensor system generally measures the "flight time" of a modulated light signal as it travels from a light source, to a surface, and back to a light sensor. A distance from the ToF sensor system to the surface is then calculated based on the flight time (e.g., by measuring phase of the light signal) and the known speed of light. Generally, performance of components of a lens (e.g., a lens assembly) of a ToF sensor system may affect the accuracy or dependability of the distance calculations. In particular, during operation, light is generally distributed over a relatively large area of a surface (e.g., a road or curb surface). Consequently, the light reflected from the surface may have a relatively low intensity. Because the ToF sensor system uses this reflected light, it may be important for the ToF sensor system to efficiently collect the reflected light by using a relatively fast lens (e.g., a lens assembly having a low f-number, f/#) to focus an image of the surface onto a pixelated sensor. Also, it may be important for such a lens to have relatively low telecentricity (e.g., a measure associated with consistent magnification based on image and/or object location) so that image magnification onto the surface of the pixelated sensor is substantially independent of an object's distance or position in the field of view of the lens. Similarly, such a lens may preferably provide a relatively homogeneous (e.g., relatively flat) illumination intensity across the surface of the pixelated sensor.

Improvements to a ToF sensor system may thus be realized by, for example, incorporating a lens having particular features, such as a relatively short track length, fast lens speed (e.g., low f-number), low telecentricity, relatively flat field illumination, and fairly low cost. In some examples, such a lens of a ToF sensor system may be a lens assembly having a fixed focal length and that avoids use of lenses having aspheric surfaces so as to achieve relatively low cost. As a result, such a lens assembly may comprise at least six spherical lenses and have a number of other design characteristics that are described in detail below.

Examples herein describe several optical assemblies that may be used in a ToF sensor system to provide data to a pixelated sensor. In various implementations, the ToF sensor system may be mounted to a vehicle, such as an autonomous vehicle. As an example, a ToF sensor system may be used by guidance, navigation, and control systems of autonomous vehicles such as automobiles, aircraft, boats, etc. Optical assemblies described herein, however, may be well-suited for use in any of a variety of applications, particularly those that incorporate laser light sources and pixelated light sensors.

FIGS. 1-6 provide additional details associated with lenses, systems, and techniques described herein.

Figure 1:
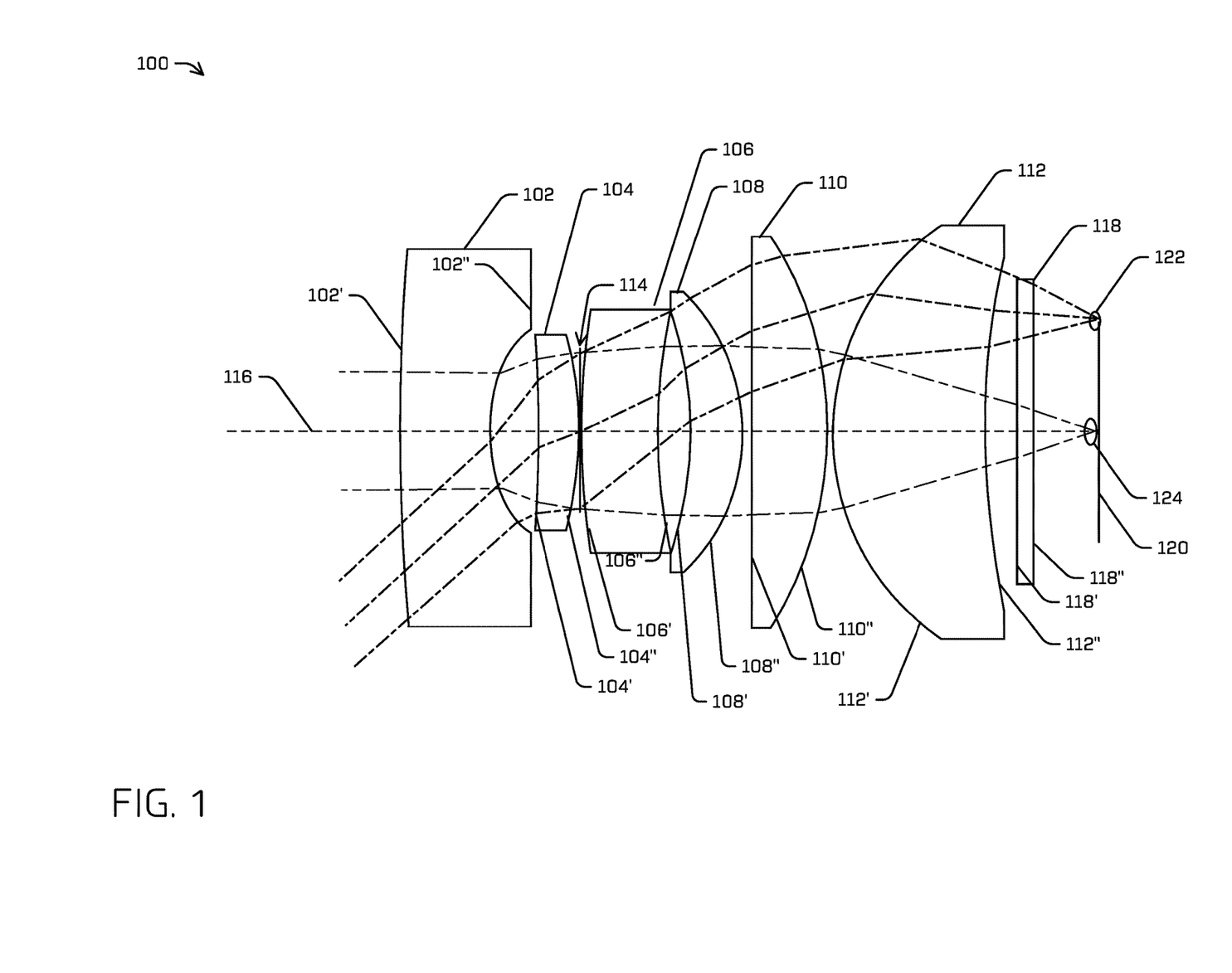
FIG. 1 is a cross-section view of an example lens assembly.

FIG. 1 is a cross-section view of an example lens assembly 100, which may be incorporated in a ToF sensor system. Lens assembly 100 includes a number of elements, comprising a first lens 102, a second lens 104, a third lens 106, a fourth lens 108, a fifth lens 110, and a sixth lens 112. First lens 102 has an entrance side 102' and an exit side 102", where "entrance" and "exit" refer to the direction that light travels in lens assembly 100 during its operation. Second lens 104 has an entrance side 104' and an exit side 104". Third lens 106 has an entrance side 106' and an exit side 106". Fourth lens 108 has an entrance side 108' and an exit side 108". Fifth lens 110 has an entrance side 110' and an exit side 110". Sixth lens 112 has an entrance side 112' and an exit side 112". Lens assembly 100 further includes an aperture stop 114. The relative size and shape of the aperture stop 114 and the lenses 102, 104, 106, 108, 110, and 112 depicted in FIG. 1, which are aligned along an optical axis 116, are a schematic representation and do not necessarily indicate their size and shape.

An optical filter 118 is located on the exit side of lens assembly 100. Optical filter 118, having an entrance side 118' and an exit side 118", may be a narrow bandpass filter, for example. A pixelated image sensor 120 may be located at the focal plane of lens assembly 100. A first light ray set 122 and a second light ray set 124 are included in FIG. 1 to indicate optical behavior of the lenses of lens assembly 100.

In some implementations, lens assembly 100 does not include aspherical lenses so that first lens 102, second lens 104, third lens 106, fourth lens 108, fifth lens 110, and sixth lens 112 are all spherical lenses that each include at least one spherical surface (e.g., both of the lens surfaces may be spherical surfaces, one surface of the lens may be spherical while the opposite surface may be planer, and so on). Also, in some implementations, first lens 102, second lens 104, third lens 106, fourth lens 108, fifth lens 110, and sixth lens 112 may all comprise a material having optical properties that are substantially independent of temperature for a relatively wide range of temperatures near room temperature (e.g., −40 to 85 degrees C.). For example, such optical properties may include, refractive index and thermal expansion. Thus, in some implementations, a non-plastic material, such as glass (e.g., crown glass, quartz, fused silica, BK7, SF4, etc.) may be used.

First lens 102, which may comprise BK7 glass, is a positive meniscus lens with entrance side 102' being convex and exit side 102" being concave. First lens 102 is on the objective side of lens assembly 100. Second lens 104 is a negative meniscus lens with entrance side 104' being concave and exit side 104" being convex. Third lens 106, which may comprise BK7 glass, is a positive meniscus lens with entrance side 106' being convex and exit side 106" being concave. Fourth lens 108 is a negative meniscus lens with entrance side 108' being concave and exit side 108" being convex. Fifth lens 110 may have a flat entrance side 110' and a convex exit side 104". Sixth lens 112, the final lens in lens assembly 100, is a positive meniscus lens with entrance side 112' being convex and exit side 112" being concave. Sixth lens 112 provides an image at the focal plane of lens assembly 100 onto image sensor 120.

In a particular implementation, lens assembly 100 may have a track length (e.g., length along an optical axis) of 23.5 millimeters and a diameter of the radially largest lens of 20 millimeters. For example, the track length and the radius of the largest lens lead to a measure of the volume of lens assembly 100. Table 1 includes various parameters of lens surfaces for such a particular implementation of lens assembly 100 in combination with optical filter 118 and image sensor 120. Table 1 describes a particular application of a ToF sensor system having an infrared light source so that lens assembly 100 is optimized for 940 nanometers. Any of the elements (e.g., lenses, aperture stop, optical filter, image sensor) may be modified by a desired amount and parameters (e.g., such as those in the following figures) of lens assembly 100 may be changed to re-optimize and/or maintain performance and characteristics of the lens assembly.

TABLE 1

| Surface | Radius of curvature [mm] | Thickness [mm] | Material | Semi-diameter (outer radius) [mm] |
|---|---|---|---|---|
| 102' | 3.38E+01 | 3.92E+00 | BK7 | 7.98E+00 |
| 102" | 2.79E+00 | 2.47E+00 | | 2.75E+00 |
| 104' | −4.45E+01 | 1.22E+00 | SF4 | 2.72E+00 |
| 104" | −1.22E+01 | 1.14E−01 | | 2.54E+00 |
| Aperture Stop (114) | Infinity | 0.00E+00 | | 2.34E+00 |
| 106' | 2.53E+01 | 2.29E+00 | BK7 | 2.44E+00 |
| 106" | 1.92E+01 | 9.98E−01 | | 3.54E+00 |
| 108' | −1.18E+01 | 1.66E+00 | SF4 | 3.64E+00 |
| 108" | −5.86E+00 | 2.46E−01 | | 4.06E+00 |
| 110' | Infinity | 2.34E+00 | SF4 | 5.06E+00 |
| 110" | −1.16E+01 | 1.39E−01 | | 5.35E+00 |
| 112' | 7.67E+00 | 4.67E+00 | SF4 | 5.85E+00 |

TABLE 1-continued

| Surface | Radius of curvature [mm] | Thickness [mm] | Material | Semi-diameter (outer radius) [mm] |
|---|---|---|---|---|
| 112" | 2.64E+01 | 9.65E−01 | | 4.93E+00 |
| 118' | Infinity | 5.00E−01 | BK7 | 4.66E+00 |
| 118" | Infinity | 2.00E+00 | | 4.49E+00 |
| Image Sensor (120) | Infinity | 0.00E+00 | | 3.41E+00 |

Table 2 describes another particular application of a ToF sensor system having an infrared light source so that lens assembly 100 is optimized for 1550 nanometers.

TABLE 2

| Surface | Radius of curvature [mm] | Thickness [mm] | Material | Semi-diameter (outer radius) [mm] |
|---|---|---|---|---|
| 102' | 3.26E+01 | 4.17E+00 | BK7 | 8.69E+00 |
| 102" | 2.83E+00 | 3.30E+00 | | 2.83E+00 |
| 104' | −5.08E+01 | 1.24E+00 | SF4 | 2.77E+00 |
| 104" | −9.29E+01 | 3.52E−01 | | 2.73E+00 |
| Aperture Stop (114) | Infinity | 0.00E+00 | | 2.49E+00 |
| 106' | 2.68E+01 | 2.31E+00 | BK7 | 2.58E+00 |
| 106" | 1.63E+01 | 8.55E−01 | | 3.58E+00 |
| 108' | −1.44E+01 | 1.49E+00 | SF4 | 3.58E+00 |
| 108" | −6.21E+00 | 1.50E−01 | | 3.92E+00 |
| 110' | Infinity | 1.43E+00 | SF4 | 4.65E+00 |
| 110" | −1.25E+01 | 9.99E−02 | | 4.77E+00 |
| 112' | 7.64E+00 | 4.77E+00 | SF4 | 5.24E+00 |
| 112" | 2.01E+01 | 5.53E−01 | | 4.33E+00 |
| 118' | Infinity | 5.00E−01 | BK7 | 4.30E+00 |
| 118" | Infinity | 2.00E+00 | | 4.19E+00 |
| Image Sensor (120) | Infinity | 0.00E+00 | | 3.51E+00 |

Such parameters of lens assembly 100 may be based, at least in part, on design constraints such as maximum angle of incidence for configuring antireflection (AR) coatings on the lens surfaces, for example. Lens assembly 100 having the parameters listed in Tables 1 and 2 has a particular performance that includes a chief ray angle that is about 2.6 degrees for field angles within a 55 degree field of view, a maximum angle of incidence of 58.5 degrees, an optical distortion (e.g., a measure of magnification homogeneity over the image field) at a 55-degree field of −39%, an effective f/# at a 0-degree field of 1.18, an effective f/# at a 55-degree field of 1.21, a relative illumination at a 55-degree field of 92%, an MTF50 (modulation transfer function, dropping to 50%) at 0 degrees of 49 cycles per millimeter (cy/mm), an MTF50 at 35 degrees of 44 cy/mm, an MTF50 at 55 degrees of 37 cy/mm, a horizontal field of view of 121 degrees, and a vertical field of view of 85 degrees. In a particular implementation, image sensor 120 may have a resolution of 640×480 pixels (horizontal x vertical) and a sensor area having a width of 6.4 millimeters and a height of 4.8 millimeters. Pixel pitch may be 10 micrometers, for example.

Figure 2:
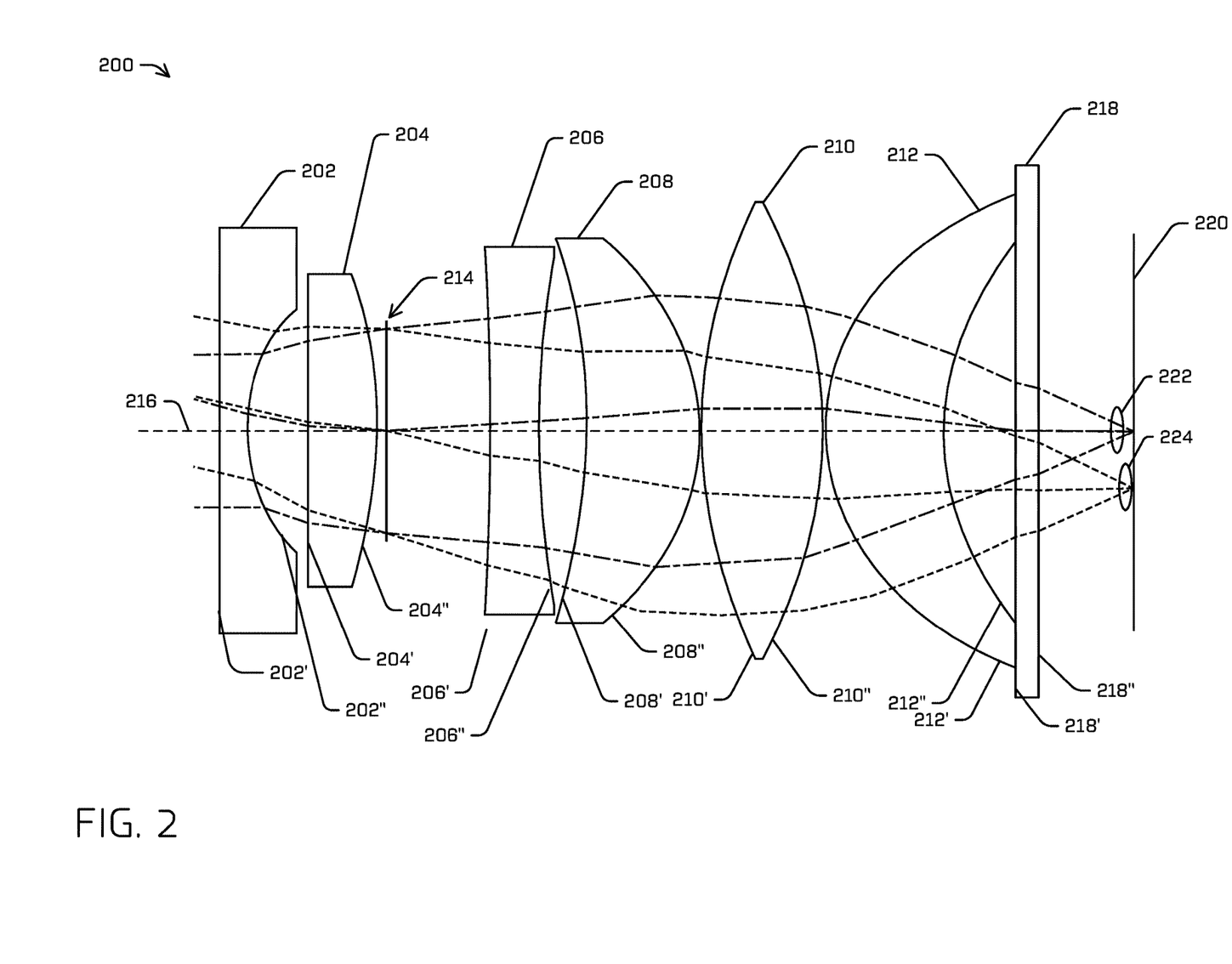
FIG. 2 is a cross-section view of another example lens assembly.

FIG. 2 is a cross-section view of an example lens assembly 200, which may be incorporated in a ToF sensor system. Lens assembly 200 includes a first lens 202, a second lens 204, a third lens 206, a fourth lens 208, a fifth lens 210, and a sixth lens 212. First lens 202 has an entrance side 202' and an exit side 202", where "entrance" and "exit" refer to the direction that light travels in lens assembly 200 during its operation. Second lens 204 has an entrance side 204' and an exit side 204". Third lens 206 has an entrance side 206' and an exit side 206". Fourth lens 208 has an entrance side 208' and an exit side 208". Fifth lens 210 has an entrance side 210' and an exit side 210". Sixth lens 212 has an entrance side 212' and an exit side 212". Lens assembly 200 further includes an aperture stop 214. The relative size and shape of the aperture stop 214 and the lenses 202, 204, 206, 208, 210, and 202 depicted in FIG. 2, which are aligned along an optical axis 216, are a schematic representation and do not necessarily indicate their size and shape.

An optical filter 218 is located on the exit side of lens assembly 200. Optical filter 218, having an entrance side 218' and an exit side 218", may be a narrow bandpass filter, for example. A pixelated image sensor 220 may be located at the focal plane of lens assembly 200. A first light ray set 222 and a second light ray set 224 are included in FIG. 2 to indicate optical behavior of the lenses of lens assembly 200.

In some implementations, lens assembly 200 does not include aspherical lenses so that first lens 202, second lens 204, third lens 206, fourth lens 208, fifth lens 210, and sixth lens 212 are all spherical lenses that each include at least one spherical surface (e.g., in some examples one of the lens surfaces may be planer). Also, in some implementations, first lens 202, second lens 204, third lens 206, fourth lens 208, fifth lens 210, and sixth lens 212 may all comprise a non-plastic material, such as crown glass (e.g., BK7 or SF4).

First lens 202 is a positive lens with entrance side 202' being flat and exit side 202" being concave. First lens 202 is on the objective side of lens assembly 200. Second lens 204 is a negative lens with entrance side 204' being flat and exit side 204" being convex. Third lens 206 is a concave lens with entrance side 206' and exit side 206" being concave. Fourth lens 208 is a negative meniscus lens with entrance side 208' being concave and exit side 208" being convex. Fifth lens 210 is a convex lens with entrance side 210' and exit side 204" being convex. Sixth lens 212, the final lens in lens assembly 200, is a positive meniscus lens with entrance side 212' being convex and exit side 212" being concave. Sixth lens 212 provides an image at the focal plane of lens assembly 200 onto image sensor 220.

In a particular implementation, lens assembly 200 may have a track length (e.g., length along optical axis) of 19.8 millimeters and a diameter of the radially largest lens of 11.6 millimeters. For example, track length and the radius of the largest lens lead to a measure of the volume of lens assembly 200. For a particular application of a ToF sensor system having an infrared light source, lens assembly 200 may be optimized for 940 nanometers, though the lens assembly may be optimized for other wavelengths. Table 3 includes various parameters of lens surfaces for such a particular implementation of lens assembly 200 in combination with optical filter 218 and image sensor 220. Any of the elements (e.g., lenses, aperture stop, optical filter, image sensor) may be modified by a desired amount and parameters (e.g., such as those in the following figures) of lens assembly 200 may be changed to re-optimize and/or maintain performance and characteristics of the lens assembly.

TABLE 3

| Surface | Radius of curvature [mm] | Thickness [mm] | Material | Semi-diameter (outer radius) [mm] |
|---|---|---|---|---|
| 202' | −2.35E+02 | 1.00E+00 | BK7 | 4.21E+00 |
| 202" | 3.53E+00 | 1.33E+00 | | 2.81E+00 |
| 204' | 8.89E+01 | 1.50E+00 | SF4 | 2.81E+00 |

TABLE 3-continued

| Surface | Radius of curvature [mm] | Thickness [mm] | Material | Semi-diameter (outer radius) [mm] |
|---|---|---|---|---|
| 204" | −8.90E+00 | 2.00E−01 | | 2.61E+00 |
| Aperture Stop (214) | Infinity | 2.20E+00 | | 2.17E+00 |
| 206' | −9.52E+01 | 1.00E+00 | BK7 | 4.70E+00 |
| 206" | 2.92E+01 | 9.00E−01 | | 4.19E+00 |
| 208' | −1.37E+01 | 2.50E+00 | SF4 | 4.15E+00 |
| 208" | −6.29E+00 | 1.00E−01 | | 4.70E+00 |
| 210' | 2.00E+01 | 2.50E+00 | SF4 | 5.77E+00 |
| 210" | −1.86E+01 | 1.00E−01 | | 5.77E+00 |
| 212' | 6.71E+00 | 2.50E+00 | SF4 | 5.77E+00 |
| 212" | 8.85E+00 | 1.50E+00 | | 4.51E+00 |
| 218' | Infinity | 5.00E−01 | BK7 | 5.77E+00 |
| 218" | Infinity | 2.00E+00 | | 4.22E+00 |
| Image Sensor (220) | Infinity | 0.00E+00 | | 3.21E+00 |

Such parameters of lens assembly 200 may be based, at least in part, on design constraints such as maximum angle of incidence for configuring antireflection (AR) coatings on the lens surfaces, for example. Lens assembly 200 having the parameters listed in Table 3 has a particular performance that includes a chief ray angle that is less than 5 degrees for field angles within a 55 degree field of view, a maximum angle of incidence of 60 degrees, an optical distortion (e.g., a measure of magnification homogeneity over the image field) at a 55-degree field of −38%, an effective f/# at a 0-degree field of 1.27, an effective f/# at a 55-degree field of 1.55, a relative illumination at a 55-degree field of 67%, an MTF50 at 0 degrees of 45 cy/mm, an MTF50 at 35 degrees of 47 cy/mm, an MTF50 at 55 degrees of 22 cy/mm, a horizontal field of view of 100 degrees, and a vertical field of view of 73 degrees. In some implementations, image sensor 220 may have a resolution of 640×480 pixels (horizontal x vertical) and a sensor area having a width of 6.4 millimeters and a height of 4.8 millimeters. Pixel pitch may be 20 micrometers, for example.

Figure 3:
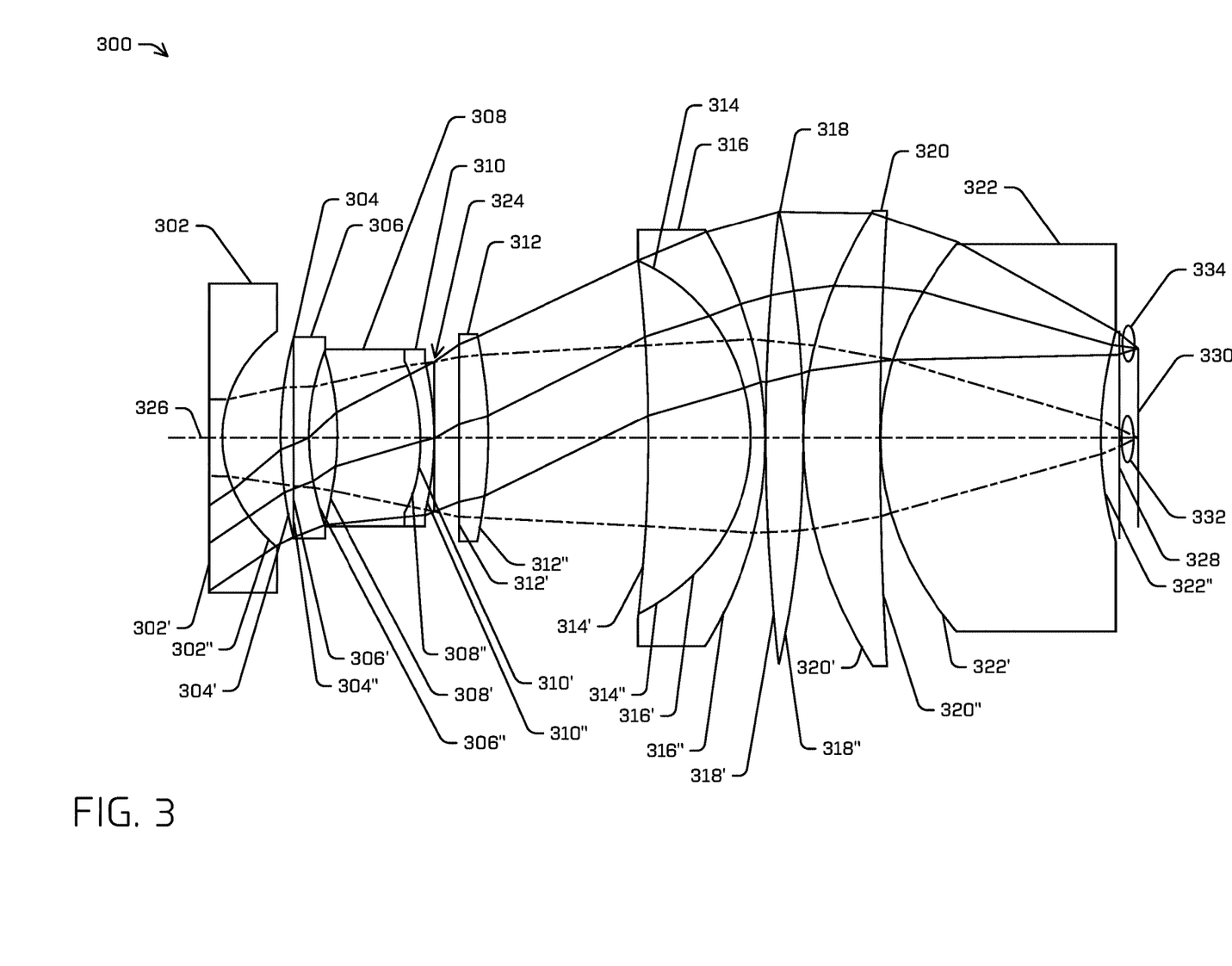
FIG. 3 is a cross-section view of still another example lens assembly.

FIG. 3 is a cross-section view of still another example lens assembly 300, which may be incorporated in a ToF sensor system. Lens assembly 300 includes a first lens 302, a second lens 304, a third lens 306, a fourth lens 308, a fifth lens 310, a sixth lens 312, a seventh lens 314, an eight lens 316, a ninth lens 318, a tenth lens 320, and an eleventh lens 322. First lens 302 has an entrance side 302' and an exit side 302", where "entrance" and "exit" refer to the direction that light travels in lens assembly 300 during its operation. Second lens 304 has an entrance side 304' and an exit side 304". Third lens 306 has an entrance side 306' and an exit side 306". Fourth lens 308 has an entrance side 308' and an exit side 308". Fifth lens 310 has an entrance side 310' and an exit side 310". Sixth lens 312 has an entrance side 312' and an exit side 312". Seventh lens 314 has an entrance side 314' and an exit side 314". Eighth lens 316 has an entrance side 316' and an exit side 316". Ninth lens 318 has an entrance side 318' and an exit side 318". Tenth lens 320 has an entrance side 320' and an exit side 320". Eleventh lens 322 has an entrance side 322' and an exit side 322". Seventh lens 314 and Eighth lens 316 may collectively comprise a compound lens.

Lens assembly 300 further includes an aperture stop 324. The relative size and shape of aperture stop 324 and the lenses depicted in FIG. 3, which are aligned along an optical axis 326, are a schematic representation and do not necessarily indicate their size and shape.

An optical filter 328 is located on the exit side of lens assembly 300. Optical filter 328 may be a narrow bandpass filter, for example. A pixelated image sensor 330 may be located at the focal plane of lens assembly 300. A first light ray set 332 and a second light ray set 334 are included in FIG. 3 to indicate an example of optical behavior of the lenses of lens assembly 300.

In some implementations, lens assembly 300 does not include aspherical lenses so that first lens 302, second lens 304, third lens 306, fourth lens 308, fifth lens 310, sixth lens 312, seventh lens 314, eighth lens 316, ninth lens 318, tenth lens 320, and eleventh lens 322 are all spherical lenses that each include at least one spherical surface (e.g., in some examples one of the lens surfaces may be planer). Also, in some implementations, these lenses may all comprise a non-plastic material, such as crown glass (e.g., BK7 or SF4).

First lens 302 is a positive lens with entrance side 302' being flat and exit side 302" being concave. First lens 302 is on the objective side of lens assembly 300. Second lens 304 and third lens 306 may collectively comprise a compound positive meniscus lens. Fourth lens 308 and fifth lens may collectively comprise a compound negative meniscus lens. Sixth lens 312 is a negative lens. Seventh lens 314 and eight lens 316 may collectively comprise a compound negative meniscus lens. Ninth lens 318 may comprise a negative lens, tenth lens 320 may comprise a positive lens, and eleventh lens, the final lens in lens assembly 300, is a positive meniscus lens with entrance side 322' being convex and exit side 322" being concave. Eleventh lens 322 provides an image at the focal plane of lens assembly 300 onto image sensor 330.

In a particular implementation, lens assembly 300 may have a track length (e.g., length along optical axis) of 19.8 millimeters and a diameter of the radially largest lens of 11.6 millimeters. For example, track length and the radius of the largest lens lead to a measure of the volume of lens assembly 300. For a particular application of a ToF sensor system having an infrared light source, lens assembly 300 may be optimized for 940 nanometers, though the lens assembly may be optimized for other wavelengths.

Figure 4:
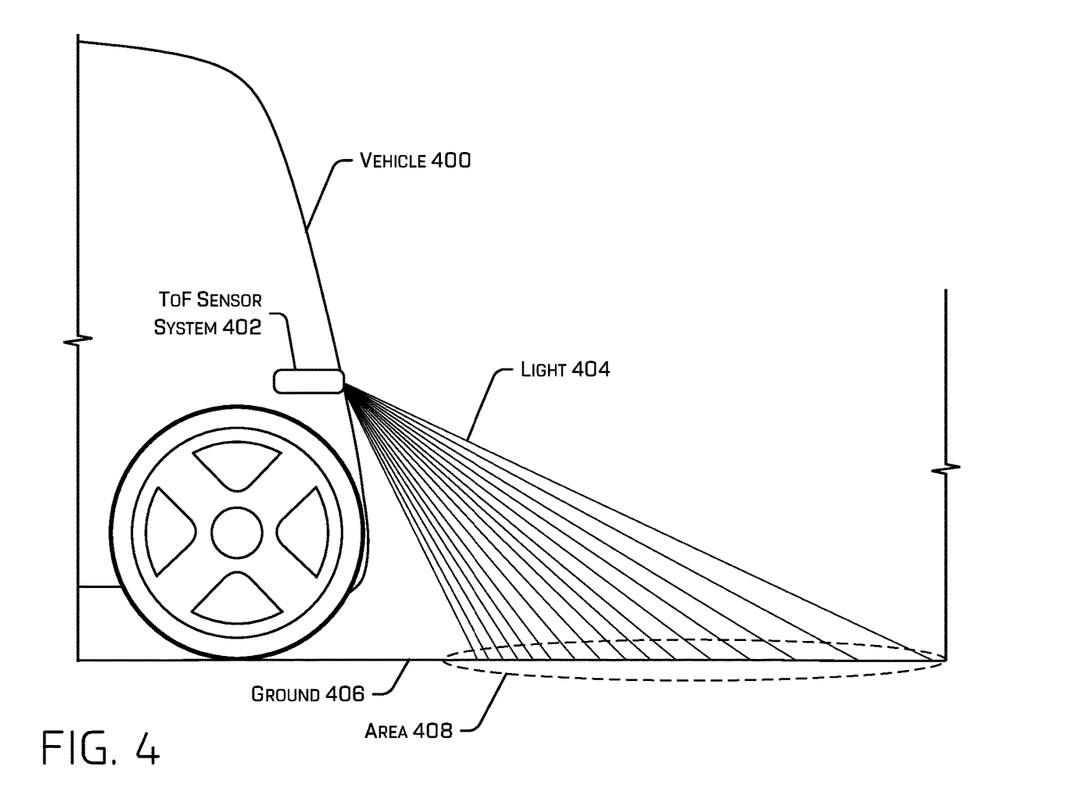
FIG. 4 is a schematic side view of a vehicle using a ToF sensor system, according to some examples.

FIG. 4 is a schematic side view of a vehicle 400 using an attached ToF sensor system 402 in an environment, according to some examples. ToF sensor system 402 may incorporate a lens assembly similar to or the same as any of lens assemblies 100, 200, or 300, for example. As depicted in FIG. 4, ToF sensor system 402 emits modulated light 404 that is directed to the ground 406 below vehicle 400 and/or to relatively near adjacent surfaces (e.g., a curb, an adjacent vehicle or other object, etc.). For a particular example, light 404 may comprise a light beam that diverges at an angle of about 85 degrees in the plane of FIG. 4, diverges at an angle of about 110 degrees in a plane perpendicular to the plane of FIG. 4, and the central angle of the beam may be directed about 45 degrees below horizontal, as depicted in FIG. 4. Of course, such angles are merely examples, and claimed subject matter is not so limited. One or more additional ToF sensor systems may be placed on vehicle 400 in various locations to capture data of the surrounding environment directly adjacent to vehicle 400, for example, at a range of 0 to about 10 meters, though other ranges are possible as well.

During operation light is generally distributed over a relatively large area 408 of a surface, such as ground 406. Light reflected from a portion of ground 406 that is further away from the ToF sensor than another portion of the ground will generally have relatively lower intensity. In some examples, an asymmetric diffuser (e.g., 504) may be incorporated into the emitter such that a uniform intensity of illumination is created over a planer surface (e.g., all portions of area 408 are illuminated with the same intensity). In at least some examples, such asymmetry may also account for asymmetries in intensity due to a mounting angle of the ToF sensor relative to the vehicle. Because the ToF sensor system uses reflected light from all portions of area 408, it may be important for the ToF sensor system to efficiently collect the reflected light by using a relatively fast lens (e.g., a lens assembly), such as lens assemblies 100, 200, or 300, to focus an image of the surface onto a pixelated sensor. Also, as mentioned above, it may be important for such a lens to have relatively low telecentricity so that image magnification onto the surface of a pixelated sensor of ToF sensor system 402 is substantially independent of distance or position of the reflected light in the field of view of the lens. Similarly, such a lens may preferably provide a relatively homogeneous (e.g., relatively flat) illumination intensity across the surface of the pixelated sensor.

Figure 5:
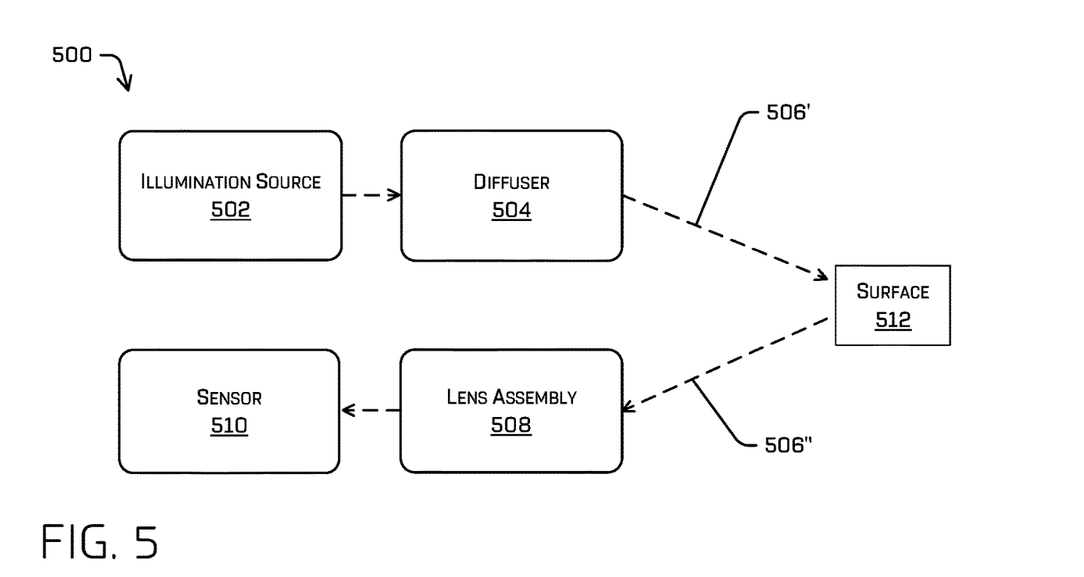
FIG. 5 is a block diagram of an example ToF sensor system.

FIG. 5 is a block flow diagram of an example ToF sensor system 500, which may be the same as or similar to ToF sensor system 402 and may incorporate a lens assembly similar to or the same as lens assemblies 100, 200, or 300. ToF sensor system 500 includes an illumination source 502 that is configured to produce modulated light. In some implementations, illumination source 502 may comprise one or more laser diodes that emit substantially coherent light in the infrared or near-infrared spectra, for example. Light from illumination source 502 is transmitted through a diffuser 504 that is configured to diffuse the light so that various portions of an area, such as area 408 of FIG. 4, are substantially equally illuminated (e.g., with homogeneous light intensity). Such equal illumination thus may occur even though the light is projected onto the surface at an acute angle.

Numbered arrow 506' schematically indicates light travelling toward a surface, being reflected by a surface 512 of an object, and then returning as reflected light 506" to ToF sensor system 500. Such returning reflected light 506" is received by a lens assembly 508, which may be the same as or similar to any of lens assemblies 100, 200, or 300, for example. Subsequently, lens assembly 508 provides an image of the surface to sensor 510. The image is substantially homogeneous in focus and intensity across the active surface (e.g., the pixel portion) of the sensor.

Figure 6:
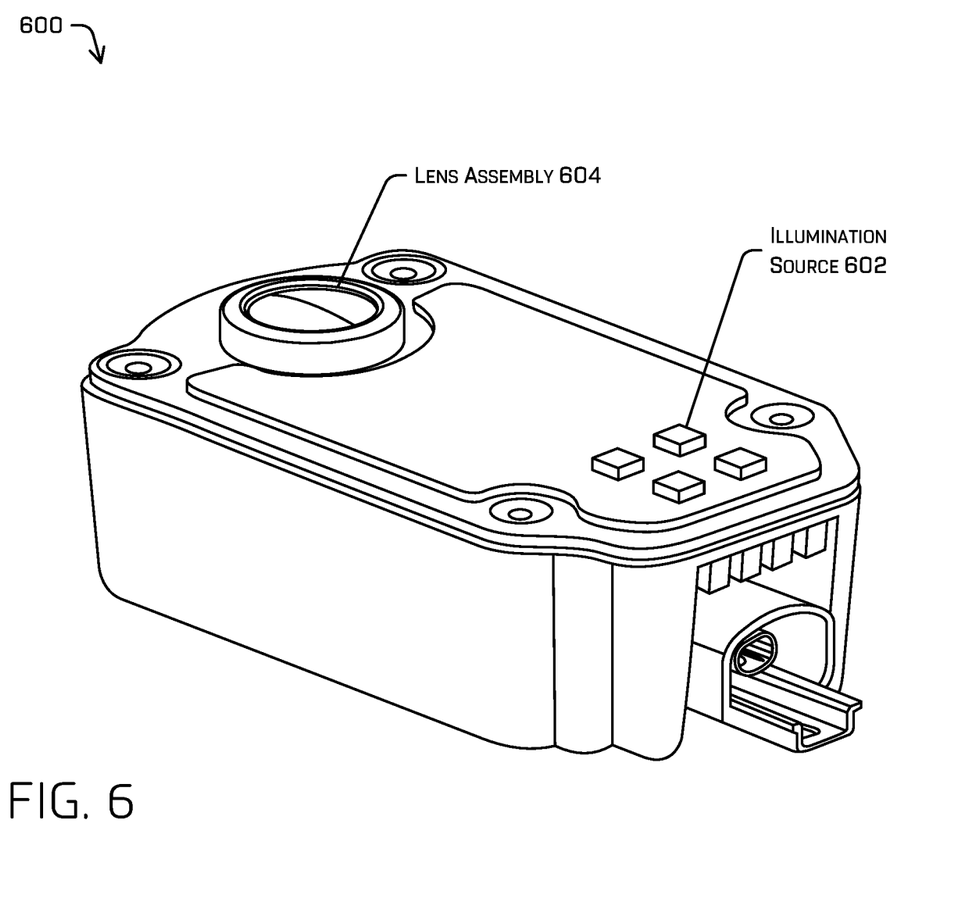
FIG. 6 is a perspective view of an example ToF sensor system.

FIG. 6 is a perspective view of an example ToF sensor system 600, which may be mounted to a vehicle, such as vehicle 400. ToF sensor system 600 includes, among other things, illumination source 602, which may comprise one or more light emitting diodes (LEDs) or laser diodes, and may be similar to or the same as illumination source 502, for example. ToF sensor system 600 also includes a lens assembly 604, which may be the same as or similar to any of lens assemblies 100, 200, or 300, for example. A pixelated image sensor (not illustrated in FIG. 6) may be internal to ToF sensor system 600 and receive an image from lens assembly 604.

Example Clauses

A. A lens assembly for a time-of flight (ToF) sensor, the lens assembly comprising: a first lens on an object side of the lens assembly comprising at least one spherical surface; a second lens adjacent to the first lens comprising at least one spherical surface; a third lens adjacent to the second lens comprising at least one spherical surface; a fourth lens adjacent to the third lens comprising at least one spherical surface; a fifth lens adjacent to the fourth lens comprising at least one spherical surface; a sixth lens adjacent to the fifth lens comprising at least one spherical surface; wherein: an f-number of the lens assembly is less than about 1.2; and a total track length of the lens assembly is less than about 30 millimeters.

B. The lens assembly of paragraph A, wherein the lens assembly comprises a fixed focal length.

C. The lens assembly of any of paragraphs A-B, wherein a diameter of the first lens, the second lens, the third lens, the fourth lens, the fifth lens, and the sixth lens is less than about 20 millimeters.

D. The lens assembly of any of paragraphs A-C, wherein the lens assembly is associated with a chief ray angle less than 5 degrees for field angles within a 55-degree field of view.

E. The lens assembly of any of paragraphs A-D, wherein the first lens, the second lens, the third lens, the fourth lens, the fifth lens, and the sixth lens comprise a material having optical properties that are substantially independent of temperature over a temperature range of −40 to 85 degrees C.

F. The lens assembly of paragraph A, wherein an aperture stop is located between the second lens and the third lens of the lens assembly.

G. The lens assembly of paragraph A, wherein the third lens, the fourth lens, and the sixth lens of the lens assembly comprise meniscus lenses.

H. The lens assembly of paragraph A, wherein at least four lenses of the lens assembly comprise meniscus lenses and wherein the second lens, the third lens, the fourth lens, and the sixth lens of the lens assembly comprise the meniscus lenses.

I. The lens assembly of paragraph A, wherein at least three lenses of the lens assembly comprise meniscus lenses.

J. The lens assembly of paragraph A, further comprising: a seventh lens adjacent to the sixth lens comprising at least one spherical surface; and an eighth lens adjacent to the seventh lens comprising at least one spherical surface, wherein an aperture stop is located between the sixth lens and the seventh lens of the lens assembly.

K. The lens assembly of paragraph A, wherein the sixth lens of the lens assembly comprises a meniscus lens.

L. The lens assembly of any of paragraphs A-K, further comprising an optical filter between the sixth lens and an optical sensor.

M. The lens assembly of any of paragraphs A-L, wherein at least one lens of the lens assembly comprises an antireflective coating optimized for light with a wavelength of about 940 nanometers.

N. A time of flight (ToF) detection system comprising: an optical sensor; and a lens assembly comprising an f-number less than about 1.2 and a track length less than about 30 millimeters, wherein the lens assembly comprises: a first spherical lens, a second spherical lens, a third spherical lens, a fourth spherical lens, a fifth spherical lens, and a sixth spherical lens.

O. The ToF detection system of paragraph N, wherein the ToF detection system is configured to mount onto an autonomous vehicle so that an optical axis of the lens assembly is directed substantially downward with respect to a ground surface associated with the autonomous vehicle.

P. The ToF detection system of paragraph O, further comprising: an illumination source; and a diffuser to receive light from the illumination source and to distribute the light over a surface proximate the autonomous vehicle so that an intensity of the light on the surface is at least approximately constant for different portions of the surface.

Q. The ToF detection system of paragraph P, wherein the first spherical lens, the second spherical lens, the third spherical lens, the fourth spherical lens, the fifth spherical lens, and the sixth spherical lens are not aspherical lenses.

R. The ToF detection system of any of paragraphs N-Q, wherein the lens assembly has a field of view in a first axis of greater than 110 degrees and a field of view in a second axis orthogonal to the first axis of greater than 85 degrees.

S. The ToF detection system of paragraph N, wherein a diameter of the first spherical lens, the second spherical lens, the third spherical lens, the fourth spherical lens, the fifth spherical lens, and the sixth spherical lens is less than about 20 millimeters.

T. The ToF detection system of any of paragraphs N-S, further comprising an optical filter configured to transmit light having a wavelength band centered at about 940 nanometers.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A lens assembly for a time-of flight (ToF) sensor, the lens assembly comprising:
    a first lens on an object side of the lens assembly comprising at least one spherical surface;
    a second lens adjacent to the first lens comprising at least one spherical surface;
    a third lens adjacent to the second lens comprising at least one spherical surface;
    a fourth lens adjacent to the third lens comprising at least one spherical surface;
    a fifth lens adjacent to the fourth lens comprising at least one spherical surface;
    a sixth lens adjacent to the fifth lens comprising at least one spherical surface; wherein:
    an f-number of the lens assembly is less than about 1.2; and
    a total track length of the lens assembly is less than about 30 millimeters.

2. The lens assembly of claim 1, wherein the lens assembly comprises a fixed focal length.

3. The lens assembly of claim 1, wherein a diameter of the first lens, the second lens, the third lens, the fourth lens, the fifth lens, and the sixth lens is less than about 20 millimeters.

4. The lens assembly of claim 1, wherein the lens assembly is associated with a chief ray angle less than 5 degrees for field angles within a 55-degree field of view.

5. The lens assembly of claim 1, wherein the first lens, the second lens, the third lens, the fourth lens, the fifth lens, and the sixth lens comprise a material having optical properties that are substantially independent of temperature over a temperature range of −40 to 85 degrees C.

6. The lens assembly of claim 1, wherein an aperture stop is located between the second lens and the third lens of the lens assembly.

7. The lens assembly of claim 1, wherein the third lens, the fourth lens, and the sixth lens of the lens assembly comprise meniscus lenses.

8. The lens assembly of claim 1, wherein at least four lenses of the lens assembly comprise meniscus lenses and wherein the second lens, the third lens, the fourth lens, and the sixth lens of the lens assembly comprise the meniscus lenses.

9. The lens assembly of claim 1, wherein at least three lenses of the lens assembly comprise meniscus lenses.

10. The lens assembly of claim 1, further comprising:
a seventh lens adjacent to the sixth lens comprising at least one spherical surface; and
an eighth lens adjacent to the seventh lens comprising at least one spherical surface,
wherein an aperture stop is located between the sixth lens and the seventh lens of the lens assembly.

11. The lens assembly of claim 1, wherein the sixth lens of the lens assembly comprises a meniscus lens.

12. The lens assembly of claim 1, further comprising an optical filter between the sixth lens and an optical sensor.

13. The lens assembly of claim 1, wherein at least one lens of the lens assembly comprises an antireflective coating optimized for light with a wavelength of about 940 nanometers.

14. A time of flight (ToF) detection system comprising:
an optical sensor; and
a lens assembly comprising an f-number less than about 1.2 and a track length less than about 30 millimeters, wherein the lens assembly comprises:
a first spherical lens, a second spherical lens, a third spherical lens, a fourth spherical lens, a fifth spherical lens, and a sixth spherical lens.

15. The ToF detection system of claim 14, wherein the ToF detection system is configured to mount onto an autonomous vehicle so that an optical axis of the lens assembly is directed substantially downward with respect to a ground surface associated with the autonomous vehicle.

16. The ToF detection system of claim 15, further comprising:
an illumination source; and
a diffuser to receive light from the illumination source and to distribute the light over a surface proximate the autonomous vehicle so that an intensity of the light on the surface is at least approximately constant for different portions of the surface.

17. The ToF detection system of claim 16, wherein the first spherical lens, the second spherical lens, the third spherical lens, the fourth spherical lens, the fifth spherical lens, and the sixth spherical lens are not aspherical lenses.

18. The ToF detection system of claim 14, wherein the lens assembly has a field of view in a first axis of greater than 110 degrees and a field of view in a second axis orthogonal to the first axis of greater than 85 degrees.

19. The ToF detection system of claim 14, wherein a diameter of the first spherical lens, the second spherical lens, the third spherical lens, the fourth spherical lens, the fifth spherical lens, and the sixth spherical lens is less than about 20 millimeters.

20. The ToF detection system of claim 14, further comprising an optical filter configured to transmit light having a wavelength band centered at about 940 nanometers.

* * * * *